Dec. 9, 1924.
F. H. ROYCE
1,518,360
MOUNTING OF ENGINE GEARS
Filed May 14, 1924
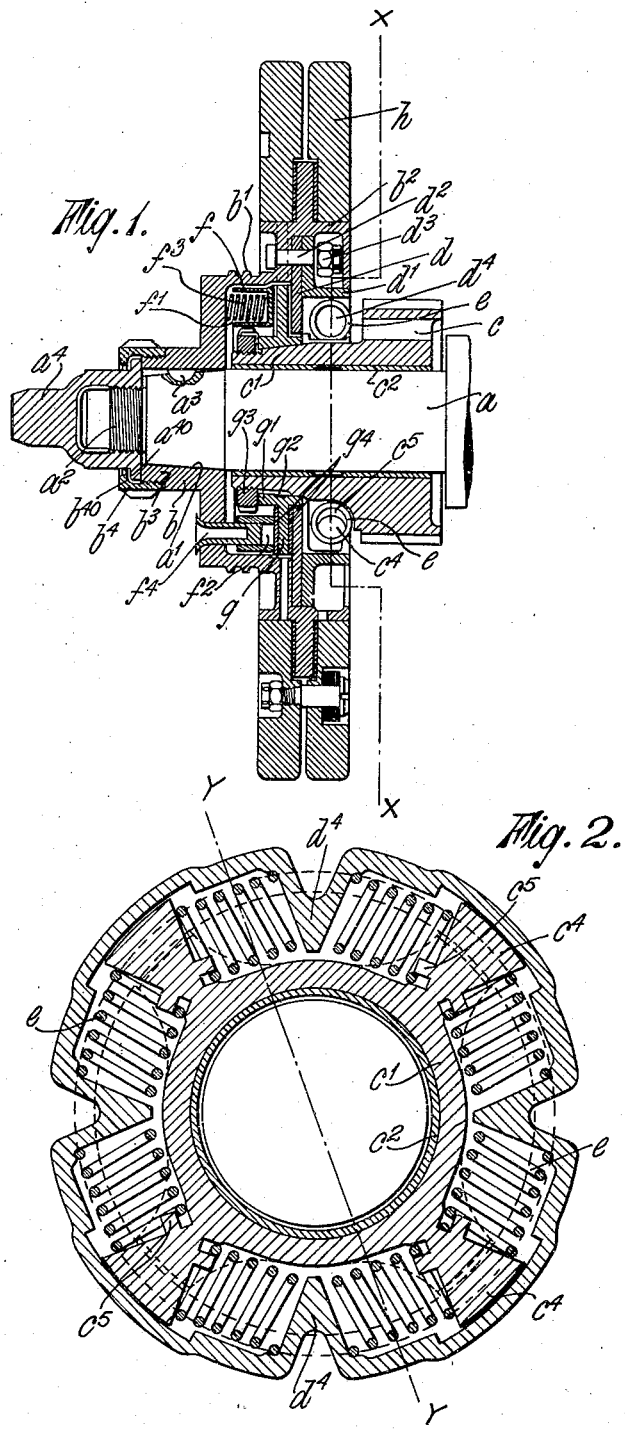
Inventor:
FREDERICK HENRY ROYCE.
Attorney:

Patented Dec. 9, 1924.

1,518,360

UNITED STATES PATENT OFFICE.

FREDERICK HENRY ROYCE, OF DERBY, ENGLAND, ASSIGNOR TO ROLLS ROYCE LIMITED, OF DERBY, ENGLAND.

MOUNTING OF ENGINE GEARS.

Application filed May 14, 1924. Serial No. 713,286.

*To all whom it may concern:*

Be it known that I, FREDERICK HENRY ROYCE, residing at Derby, England, a subject of the King of Great Britain and Ireland, have invented certain new and useful Improvements in the Mounting of Engine Gears, of which the following is a specification.

This invention has reference to the mounting of the gears of engines and is useful in particular in connection with the half time gear of internal combustion engines. The object of the invention is to produce a friction-damped resilient drive between the engine shaft and a pinion mounted thereon in which there shall be no rotational slack in the damping device and no end slack as between the pinion and the engine shaft, either of which if present might occasion objectionable noise.

In some or all of the damped resilient drives heretofore used for the half-time gear of internal combustion engines, the damping has been effected through the agency of brake shoes anchored to the pinion by pinned joints or by means of friction discs coupling the pinion and the shaft by means of serrations or teeth. In all such cases there is a rotational slack, in the former case in the pinned joints, and in the latter in the serrations or teeth, which under certain conditions produce the objectionable noise referred to.

According to my invention the gear is made as follows:—The spring drive may be of any suitable form but is preferably as hereinafter described. The resilient drive is damped, and all end slack eliminated (the importance of which is greater in the case of helical gearing) by a friction device in which a plate or disc rigidly mounted on the pinion or the hub thereof is pressed against a plate or disc rigidly mounted on the shaft by a spring loaded pressure plate mounted on or carried by the shaft and rotationally rigid therewith, the plate or disc and the pressure plate being furnished with suitable friction surfaces, and the tension of the springs being such as to prevent any axial relative movement of the said plates or discs while allowing the desired rotational relative movement to permit the resilient drive to be effective.

An embodiment of my invention is illustrated in the accompanying drawings in which Fig. 1 is a sectional elevation of the spring drive on line Y—Y of Fig. 2, which latter figure is an end sectional view on an enlarged scale on line X—X of Fig. 1.

In the construction shown in the drawings there is mounted on and rigidly attached to the driving shaft $a$ of the engine a drum $b$ having two diameters $b^1$ and $b^2$, the rim of each part being cylindrical and concentric with the shaft $a$ and the base both of the smaller part and the larger part being at right angles to the shaft. The outer rim of the larger part is utilised for the purpose of carrying a slipper fly-wheel $h$.

The crank shaft $a$ has a tapered part $a^1$, a threaded part $a^2$, and a keyway formed therein as at $a^3$. The drum $b$ has an interiorly tapered portion $b^3$ fitting the tapered part $a^1$ of the shaft, and the outer end of this portion $b^3$ has applied to it a nut or collar $b^4$; said drum being secured against axial movement by a nut $a^4$ screwed on the threaded shaft part $a^2$. The nut $a^4$ has an external flange $a^{40}$ which overlaps an internal flange $b^{40}$ on the nut or collar $b^4$ so that when the nut $a^4$ is unscrewed the said flanges will engage and the drum be drawn off the shaft.

The pinion $c$ of the gear is mounted on the shaft $a$ outside the open end of the drum $b$, and has a hub $c^1$ with interposed sleeve $c^2$ extended along the shaft into the interior of the smaller diameter part of the drum.

A ring $f$ of metal, constituting a pressure plate for the friction device about to be described, slidably fits in the small part of the drum $b$ and has bored in one face alternately a number of holes $f^1$ forming pockets for helical springs $f^3$ and a number of other holes $f^2$ to receive with a close fit pins $f^4$ carried on the base of the smaller part of the drum. The said pins $f^4$ do not extend to the full depth of the holes $f^2$ so that the presser plate, so far as such pins are concerned, can move axially while the pins prevent it from moving rotationally in relation to the base of the drum $b$, and hence in relation to the shaft $a$.

Two annular members $d$ and $d^1$ are connected by bolts $d^2$ and nuts $d^3$ to the base of the larger part of the drum $b$, the inner member $d$ being a flat plate or disc which extends inwards towards the shaft (with, however, a clearance between it and the shaft) and acts as the outer plate of the friction device. The outer annular member $d^1$ is of L-shape in section so that with one of its arms bolted as aforesaid, the other arm forms an annular flat ring concentric with, but at a considerable distance from, the hub $c^1$ of the pinion $c$. Extending inwardly from said ring are a number of V-shaped projections $d^4$, the apex of each of which is directed inwards towards the shaft, and each side of which forms a flat surface suitable for a helical spring $e$ to impinge on. There are attached to or formed integrally with the hub $c^1$ of pinion $c$, either extended from the face thereof or otherwise, projections $c^4$ also approximately V-shaped with the apices turned inwards and each side being suitably shaped to receive and hold the opposite ends of the spiral springs $e$ by means of a suitable locating lug $c^5$. The said projections $d^4$ and $c^4$ on the ring and pinion respectively interlock and there is installed between each of the projections $d^4$ and the adjacent projection $c^4$ one of the spiral springs $e$.

An annular plate or disc $g$, provided with a sleeve hub $g^1$ which extends on either side thereof and which is internally tapered to fit and correspond with a tapered part of the hub $c^1$ of the pinion $c$, is rigidly mounted on the sleeve hub of the pinion by means of a key $g^2$. The disc $g$ is held against axial movement on the sleeve by nut $g^3$.

The said annular plate $g$ is located between the pressure plate $f$ above referred to and the annular member $d$ previously described as forming the end plate of the friction device, there being interposed between the parts mentioned friction washers $g^4$. The disc $g$ is pressed by said pressure plate $f$ and held against the end plate $d$, thus definitely and unalterably locating the pinion $c$ axially in relation to the shaft without any end slack. The tension of the springs $e$ is sufficient to resist any axial movement of the pinion caused, for instance, by the use of a helical gear, while allowing the desired rotational movement to permit effect being given to the resilient drive.

With apparatus constructed as described, owing to the springs $e$ between the lugs $c^4$ and $d^4$ the drive is resilient, and all rotational slack is eliminated by reason of the friction device constituted by the disc $g$ and washers $g^4$ compressed between the plate $d$ and the spring loaded annular member $f$ whereby oscillation is damped out and, owing to the springs $f^3$, all end slack is eliminated.

What I claim as my invention and desire to secure by Letters Patent of the United States:—

1. In gearing for internal combustion engines, the combination, with an engine shaft, of a gear rotatively mounted thereon; alternate, spaced projections associated with the shaft and gear extending outwardly from the latter and inwardly from the former; springs interposed between the projections of the shaft and gear, respectively; and frictionally-engaging members consisting of a plate rigidly secured to the gear, a plate rigidly secured to the shaft, and a spring-loaded pressure member adapted to press said plates together with frictional contact.

2. In gearing for internal combustion engines, the combination, with an engine shaft, of a gear having a sleeve mounted on the shaft for rotation thereon, lugs projecting radially outwards from said sleeve, a drum rigidly mounted on the shaft, lugs projecting radially inwards from the drum and spaced relatively to said lugs on the sleeve, helical springs interposed between the lugs of the sleeve and drum, frictionally engaging members rigidly mounted on said shaft and gear, and spring means for ensuring engagement of said friction members.

3. In gearing for internal combustion engines, the combination, with an engine shaft, of a gear rotatively mounted thereon, alternate spaced projections associated with the shaft and gear extending outwardly from the latter and inwardly from the former, springs interposed between the projections of the shaft and gear respectively, frictionally engaging members carried by said shaft and gear, an annular element associated with said friction members and provided with spaced apertures, and springs and pins associated with the shaft adapted to engage alternate ones of said apertures.

4. In gearing for internal combustion engines, the combination, with an engine shaft, of a gear having a sleeve mounted on the shaft for rotation thereon, lugs projecting radially outwards from said sleeve, a drum rigidly mounted on the shaft, lugs projecting radially inwards from the drum and spaced relatively to said lugs on the sleeve, helical springs interposed between the lugs of the sleeve and drum, frictionally engaging members rigidly mounted on said shaft and gear, spring means for ensuring engagement of said friction members, a nut applied to the end of the shaft, a nut applied to the adjacent end of the drum, and overlapping flanges on said nuts adapted for engagement when the first-mentioned nut is removed from the shaft.

In witness whereof I have signed this specification.

FREDERICK HENRY ROYCE.